United States Patent
Pannewitz (10) Patent No.: US 9,314,946 B2
(45) Date of Patent: Apr. 19, 2016

(54) PRESS

(71) Applicant: Fette Compacting GmbH, Schwarzenbek (DE)

(72) Inventor: Thomas Pannewitz, Klein Pampau (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 14/557,932

(22) Filed: Dec. 2, 2014

(65) Prior Publication Data

US 2015/0158210 A1    Jun. 11, 2015

(30) Foreign Application Priority Data

Dec. 6, 2013    (DE) .......................... 10 2013 113 665

(51) Int. Cl.

| | |
|---|---|
| *B29C 43/02* | (2006.01) |
| *B30B 11/00* | (2006.01) |
| *B30B 11/02* | (2006.01) |
| *B30B 15/04* | (2006.01) |
| *B29L 31/00* | (2006.01) |

(52) U.S. Cl.
CPC ............ *B29C 43/027* (2013.01); *B30B 11/005* (2013.01); *B30B 11/007* (2013.01); *B30B 11/02* (2013.01); *B30B 15/04* (2013.01); *B29L 2031/772* (2013.01)

(58) Field of Classification Search
CPC .... B29C 43/027; B29C 43/006; B29C 43/00; B30B 15/04; B30B 11/02; B30B 11/002; B30B 11/007; B29L 2031/772
USPC ................... 425/406, 167, 169, 78, 352–355
See application file for complete search history.

(56) References Cited

U.S. PATENT DOCUMENTS

| | | |
|---|---|---|
| 7,379,783 B2 | 5/2008 | Popp |
| 7,379,784 B2 | 5/2008 | Popp |
| 7,392,107 B2 | 6/2008 | Popp |
| 7,726,961 B2 | 6/2010 | Baltruschat et al. |
| 7,799,273 B2 | 9/2010 | Popp |
| 7,862,753 B2 | 1/2011 | Yamaguchi et al. |
| 8,186,988 B2 | 5/2012 | Baltruschat et al. |
| 8,660,680 B2 | 2/2014 | Popp |
| 2003/0180408 A1 | 9/2003 | Hinzpeter et al. |

(Continued)

FOREIGN PATENT DOCUMENTS

| | | |
|---|---|---|
| DE | 10 2011 116 552 A1 | 4/2013 |
| EP | 1 346 821 A2 | 9/2003 |

(Continued)

*Primary Examiner* — Joseph S Del Sole
*Assistant Examiner* — Nahida Sultana
(74) *Attorney, Agent, or Firm* — Young Basile Hanlon & MacFarlane P.C.

(57) ABSTRACT

A press producing a pellet from powdered material includes a press frame with upper and lower retaining plates connected by spacers and a support frame therebetween. A tool guiding unit has an upper punch plate with an upper press punch and/or a lower punch plate with a lower press punch and a die plate fastened at opposite sides of the frame having a material receptacle. An upper and/or lower drive unit for operating the punches so that reaction forces are introduced into the frame. A measurement ruler is fastened in a thermal zero point of the frame in a plane between the opposite sides. Measurement slides are arranged at the die plate and at the upper punch plate and/or the lower punch plate and interact with the ruler so that vertical movement and bending of the upper punch plate, the lower punch plate and/or the die plate are measured.

10 Claims, 4 Drawing Sheets

(56) References Cited

U.S. PATENT DOCUMENTS

| | | | |
|---|---|---|---|
| 2005/0214396 A1* | 9/2005 | Minakawa | B30B 15/026 425/78 |
| 2007/0087073 A1* | 4/2007 | Chowdhury | B29C 43/08 425/408 |
| 2014/0094949 A1 | 4/2014 | Popp | |
| 2014/0287078 A1 | 9/2014 | Behns et al. | |
| 2015/0290881 A1* | 10/2015 | Ederer | B29C 67/0077 264/109 |
| 2015/0314389 A1* | 11/2015 | Yamada | B23K 15/0086 219/76.1 |

FOREIGN PATENT DOCUMENTS

| | | |
|---|---|---|
| EP | 1 849 590 A1 | 10/2007 |
| EP | 2 123 435 A1 | 11/2009 |
| EP | 2 149 450 A2 | 2/2010 |
| EP | 2 361 758 A2 | 8/2011 |
| GB | 2 053 074 A | 2/1981 |
| JP | H05-057497 A | 3/1993 |
| JP | 2007-152366 A | 6/2007 |

* cited by examiner

PRESS

FIELD OF THE DISCLOSURE

The invention relates to a press for producing a pellet from powdered material, for example a metal or ceramic powder.

DESCRIPTION OF RELATED ART

The powdered material is filled into a mold receptacle of a die plate, and subsequently pressed into a pellet in the mold receptacle using, for example, an upper punch and a lower punch. Such a press is known for example from DE 10 2011 116 552 A1. There is a need to determine the vertical position of the plates of the tool guiding unit, in particular the upper, or respectively the lower, punch plate and the die plate. A corresponding measurement apparatus for a differently developed press is known from EP 1 849 590 B1. There, a single measurement ruler is attached in the longitudinal center thereof at a vertical guide designed as a vertical guide column, wherein the vertical guide column is arranged on one side of the guide column Measurement slides, which interact with the measurement ruler for measuring the vertical position of the plates, are arranged on the plates to be measured. The vertical guide column holding the measurement ruler is mounted on a lower housing part of the press frame using a bearing plate. By permitting a limited relative movement between the vertical guide column and the press frame, length changes of the press frame due to thermal influences and press forces should be prevented from influencing the measurement result.

BRIEF SUMMARY

In EP 1 849 590 B1, high press forces during operation, and the deformations of the press frame associated with such forces, can result in a shift in position of the tool guiding unit including the vertical guide column This shift in position is also experienced by the measurement ruler. The amount of the shift must be determined elaborately in the evaluation, and compensated. In addition, only vertical movements of the retaining plates can be detected with the known measurement apparatuses, not those due to deformations of the retaining plates, in particular bending of the retaining plates.

In contrast, in the press described herein, the vertical position and a possible deformation of the upper and/or lower punch plates and/or the die plate can be determined reliably even in the case of high press forces.

In one implementation, the teachings herein describe a press for producing a pellet from a powdered material including a press frame with an upper and a lower retaining plate, which are connected together by several vertical spacers. The press frame also has at least one support frame, which is arranged between the upper and the lower retaining plate. The press further includes a tool guiding unit with at least one upper punch plate having at least one upper press punch and/or with at least one lower punch plate having at least one lower press punch, and with a die plate having at least one receptacle for powdered material to be pressed by the upper and/or lower press punch and at least one upper drive unit for moving the upper punch plate in the vertical direction and/or at least one lower drive unit for moving the lower punch plate and/or the die plate in the vertical direction. The upper drive unit and/or the lower drive unit, during operation, are supported at the support frame in such a manner that the reaction forces, which are generated as action forces by the press forces produced during pressing of the powdered material in the at least one receptacle, are introduced into the support frame. The support frame surrounds the die plate of the tool guiding unit forming a frame at least in sections, and the die plate is fastened on opposite sides of the support frame. A measurement ruler is fastened to the support frame in the thermal zero point thereof and in a plane between the opposite sides of the support frame fastened to the die plate, and a measurement slide is arranged in each case at the upper punch plate and/or at the lower punch plate and at the die plate. The measurement slides interact with the measurement ruler in such a manner that a vertical movement and a bending of the upper punch plate and/or the lower punch plate and/or the die plate can be measured.

The press according to an implementation has a press frame with an upper and lower retaining plate which are connected by vertical spacers and thus form a frame, or respectively a housing, of the press. The press, using the lower retaining plate, stands using feet or stands directly on the ground. The press further comprises a tool guiding unit, in particular a tool guiding frame. The tool guiding unit has one or more upper and/or lower punch plate(s), each having at least one upper and/or lower punch. The tool guiding unit further has a die plate with a form receptacle into which the powder to be pressed is filled. The powdered material can be, for example, a metal or ceramic powder. Frequently, the press comprises at least one upper and lower punch, which interact in the receptacle of the die plate for pressing the filled powder. However it is also conceivable to provide a pressing, for example, only from above using only one upper punch if the accommodation of the die plate has a closed bottom.

Upper and/or lower drive units may be provided for the vertical movement of the upper and/or lower punch in the course of the pressing procedure. In principle, it is possible to provide more than one, for example two, upper drive units and more than one, for example two, lower drive units. If two upper drive units and/or two lower drive units are provided, these can be arranged symmetrically on two opposing sides of the press frame. It is also conceivable to provide only one drive unit on one side and only one guiding unit on the opposing side. As explained, the lower drive unit can drive a lower punch plate or a die plate in the vertical direction. Thus, it is possible to operate the press in an ejection method in which the die plate is stationary and the upper and lower punches move with respect to the die plate, as well as in the pull-off method in which the lower punch is stationary and the die plate and the upper punch are movable. Basically, the press according to the teachings herein permits the number of press axes and thus the pellets produced in parallel to be increased within broad limits The press frame of the press may have a support frame arranged between the retaining plates. The support frame can be arranged, for example, centrally between the retaining plates. The support frame is designed separated from the die plate and is suitable for the purpose of absorbing strong forces. The tool guiding unit is arranged on the support frame. In addition, the upper drive unit and/or the lower drive unit during operation are supported at the support frame, in particularly directly and in such a manner that the reaction forces, which are generated as action forces by the press forces produced during pressing of the powdered material in the at least one receptacle, are introduced at least for the most part into the support frame. That is, in the course of the pressing procedure, the upper and lower punch exert a significant press force through the upper and/or lower drive unit onto the powdered material to be pressed into a pellet. This press force generates a reaction force or a counter force as action force which in turn acts via the upper and lower punch on the upper and/or drive unit. Thus, this reaction force introduced via the upper and lower punch into the upper and/or lower drive unit is introduced into the support frame. The remaining parts of the press frame, in particular the vertical spacers between the retaining plates, do not participate substantially in this force flow. Also, these forces are not introduced again into the die plate via the upper and/or lower drive unit. The press frame is desirably a press frame without a column, in which the vertical spacers need not be designed for accommodating high press forces. Because forces do not flow substantially via the relatively long columns of a press frame, there is a reduced deflection of the press. A bending of the press frame and the undesirable influences on the pressing result connected with such bending are largely avoided. Furthermore, in an advantageous manner, only a few components of the press are located in the force flow. As a result, only a few component tolerances are added together. The components located in the force flow, in particular the support frame, can be produced in a constructively simple manner with small tolerances. With less constructed expenditure than needed with the above art, a precise press result can be attained. Furthermore, the entire height of the press is small because the drive units can be integrated in the press frame.

In one implementation, the tool guiding unit forms a so-called adapter. The fastening of the tool guiding unit at the support frame may occur only via the die plate, namely in that the die plate is fastened only to two opposite sides of the support frame. The tool guiding unit is thereby coupled only to the support frame. The support frame in turn is largely decoupled from movement of the press frame due to the force introduction such that the tool guiding unit is also decoupled from movement of the press frame.

The support frame can be constructed in one piece. It surrounds the die plate forming a frame at least in sections, for example at least on three sides. The measurement ruler is fastened at the thermal zero point thereof, that is, in the longitudinal center thereof, to the support frame. At the same time, the support frame lies in the thermal zero point of the press. Therefore, thermally dependent length changes have no effect on the measurement. Where the measurement ruler is likewise fastened only to the support frame, the measurement ruler is also decoupled from movement of the press frame via the support frame. In this arrangement, the measurement ruler has only an indirect connection to the tool guiding unit via the measurement slides.

In certain implementations, the measurement ruler has a vertical measurement axis. It is fastened to the support frame in a plane between the opposing sides of the support frame fastened to the die plate. It is understood that the measurement ruler has a lateral extent perpendicular to the longitudinal axis thereof. In particular, the vertical plane in which the measurement ruler is fastened to the support frame can lie, for example, centrally to the lateral extent of the measurement ruler. In contrast to the art previously described, a bending of the plates of the tool guiding unit, in particular the upper and/or lower punch plates and/or the die plate, can be measured due to the fastening of the measurement ruler between the sides of the support frame fastened to the die plate. Therefore, according to implementations of the invention, the vertical positions and possible deformations of the upper and/or lower punch plates and the die plate can be measured directly with greater accuracy. Faults, for example tool breakage among others, are minimized.

Measurement sensors or measurement sending apparatuses, for example, can form the measurement slides. Appropriate measurement sending apparatuses or measurement sensors can then be arranged on the measurement ruler. In principle, almost any measurement method is possible. The measuring can occur optically for example. For this purpose, the measurement ruler or the measurement slides can have suitable optical sensors which then receive an optical signal of an optical sending apparatus provided on the measurement slide, or respectively on the measurement ruler. A suitable evaluation apparatus evaluates the measured signals. However, other measuring principles are also possible, for instance proximity sensors among others can be used.

According to one preferred implementation, the measurement ruler can be fastened to the support frame in a plane lying centrally between the opposing sides of the support frame fastened to the die plate. Generally, the greatest deformation of the die plate, or respectively the upper and/or lower punch plates, occurs centrally or respectively in the middle, between the opposing sides of the support frame. A particularly high accuracy is attained in that the measurement is made there.

According to a further design, the support frame can have a U-shape which lies in a horizontal plane, wherein the die plate is fastened to the opposing free limbs of the support frame, and wherein the measurement ruler is fastened to the section of the support frame connecting the free limbs, in particular centrally. The free limbs can be arranged parallel to each other and can be connected together by a section running rectangular to the free limbs. The die plate, in a top view, can be rectangular, in particular, quadratic in shape.

According to a further design, the die plate and the support frame can be arranged in the same arrangement plane or an arrangement plane slightly separated from each other. The arrangement plane is, in an implementation, a horizontal plane. Both the die plate as well as the support frame generally have an extent in a direction perpendicular to the arrangement plane, in this case, in a vertical direction. The arrangement plane can then lie, for example, centrally to the vertical extent of the die plate, or respectively the support frame. The arrangement plane of the die plate forms a reference plane in which, with this design, both the die plate as well the measurement ruler are fastened to the support frame.

According to a further particularly practical design, the tool guiding unit can form a module removable as a whole from the press, and can be exchanged for another tool guiding unit also forming a module.

According to a further design, the upper drive unit is arranged between the support frame and the upper punch plate, and/or that the lower drive unit is arranged between the support frame and the lower punch plate or the die plate. The upper drive unit is fastened directly, or via an upper force transmitting element, to the upper punch plate, and/or the lower drive unit is fastened directly, or via a lower force transmitting element, to the lower punch plate or the die plate. Furthermore, the upper force transmitting element may comprise an upper force transmitting bridge, wherein two upper drive units are provided that are fastened to the upper force transmitting bridge, and/or the lower force transmitting element may comprise a lower force transmitting bridge, wherein two lower drive units are provided that are fastened to the lower force transmitting bridge.

According to a further design, the upper drive unit can comprise at least one upper spindle drive driven by at least one electric motor, and/or the lower drive unit can comprise at least one lower spindle drive driven by at least one electric motor. At least one electric motor of the upper spindle drive can be fastened to the upper retaining plate of the press frame, and/or at least one electric motor of the lower spindle drive can be fastened to the lower retaining plate of the press frame. Furthermore, an upper fixed bearing of an upper spindle of at least one upper spindle drive may be fastened to the support frame, and an upper spindle nut of the at least one upper spindle drive may be fastened directly, or via an upper force transmitting element, to the upper punch plate, and/or a lower fixed bearing of a lower spindle of at least one lower spindle drive may be fastened to the support frame, and a lower spindle nut of the at least one lower spindle drive may fastened directly, or via a lower force transmitting element, to the lower punch plate and/or the die plate. The at least one electric motor can be a hollow shaft motor.

In this implementation, the electric motor may be fastened to the support frame, wherein the electric motor drives an upper spindle nut of the at least one upper spindle drive, wherein an upper spindle of the at least one upper spindle drive is fastened directly, or via an upper force transmitting element, to the upper punch plate. The electric motor may also drive a lower spindle nut of the at least one lower spindle drive, wherein a lower spindle of the at least one lower spindle drive is fastened directly, or via a lower force transmitting element, to the lower punch plate and/or the die plate.

Alternatively, the electric motor is fastened directly, or via an upper force transmitting element, to the upper punch plate and drive an upper spindle nut of the at least one upper spindle drive, and an upper spindle of the at least one upper spindle drive is fastened to the support frame. In another alternative, the electric motor is fastened directly, or via a lower force transmitting element, to the lower punch plate and/or the die plate and drives a lower spindle nut of the at least one lower spindle drive, wherein a lower spindle of the at least one lower spindle drive is fastened to the support frame.

Further alternatively, the electric motor is fastened to the support frame, and the electric motor rotationally drives an axially movable upper spindle of the at least one upper spindle drive, and an upper fixed bearing of the at least one upper spindle drive is fastened directly, or via an upper force transmitting element, to the upper punch plate. Alternatively or in addition thereto, the electric motor rotationally drives an axially movable lower spindle of the at least one lower spindle drive, and a lower fixed bearing of the at least one lower spindle drive is fastened directly, or via a lower force transmitting element, to the lower punch plate and/or the die plate.

In an implementation, the electric motor is fastened directly, or via an upper force transmitting element, to the upper punch plate and rotationally drives an axially movable upper spindle of the at least one upper spindle drive, and an upper fixed bearing of the at least one upper spindle drive is fastened to the support frame. Alternatively or in addition thereto, the electric motor is fastened directly, or via a lower force transmitting element, to the lower punch plate and/or the die plate, and rotationally drives an axially movable lower spindle of the at least one lower spindle drive, and a lower fixed bearing of the at least one lower spindle drive is fastened to the support frame.

Of course it is also possible in principle that the upper drive unit comprises at least an upper hydraulic or electrohydraulic drive, and/or that the lower drive unit comprises at least one lower hydraulic or electrohydraulic drive.

Further details of these implementations, including modifications to these implementations, and details regarding other implementations of the teachings herein are described below with reference to the drawings.

BRIEF DESCRIPTION OF THE DRAWINGS

An exemplary embodiment of the invention is explained in the following in more detail using the drawings below in which like reference numbers refer to like elements unless otherwise noted and in which.

DETAILED DESCRIPTION

Figure 1:
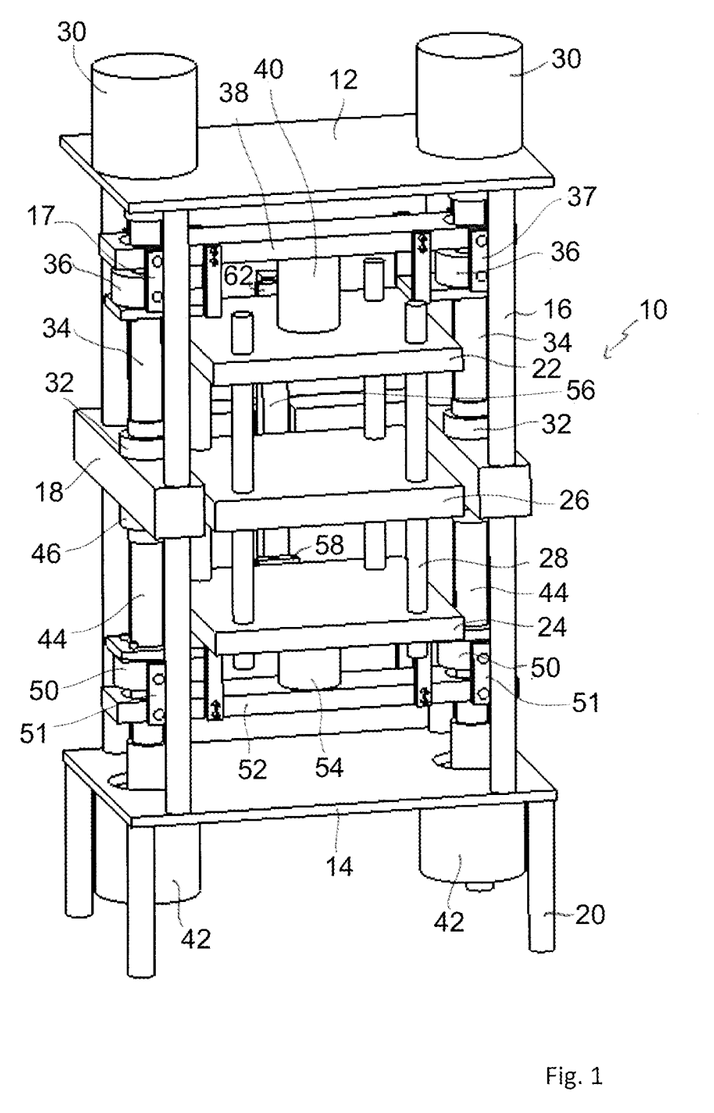
FIG. 1 is a press according to one implementation of the invention, at rest, in a perspective view from the front.
Figure 2:
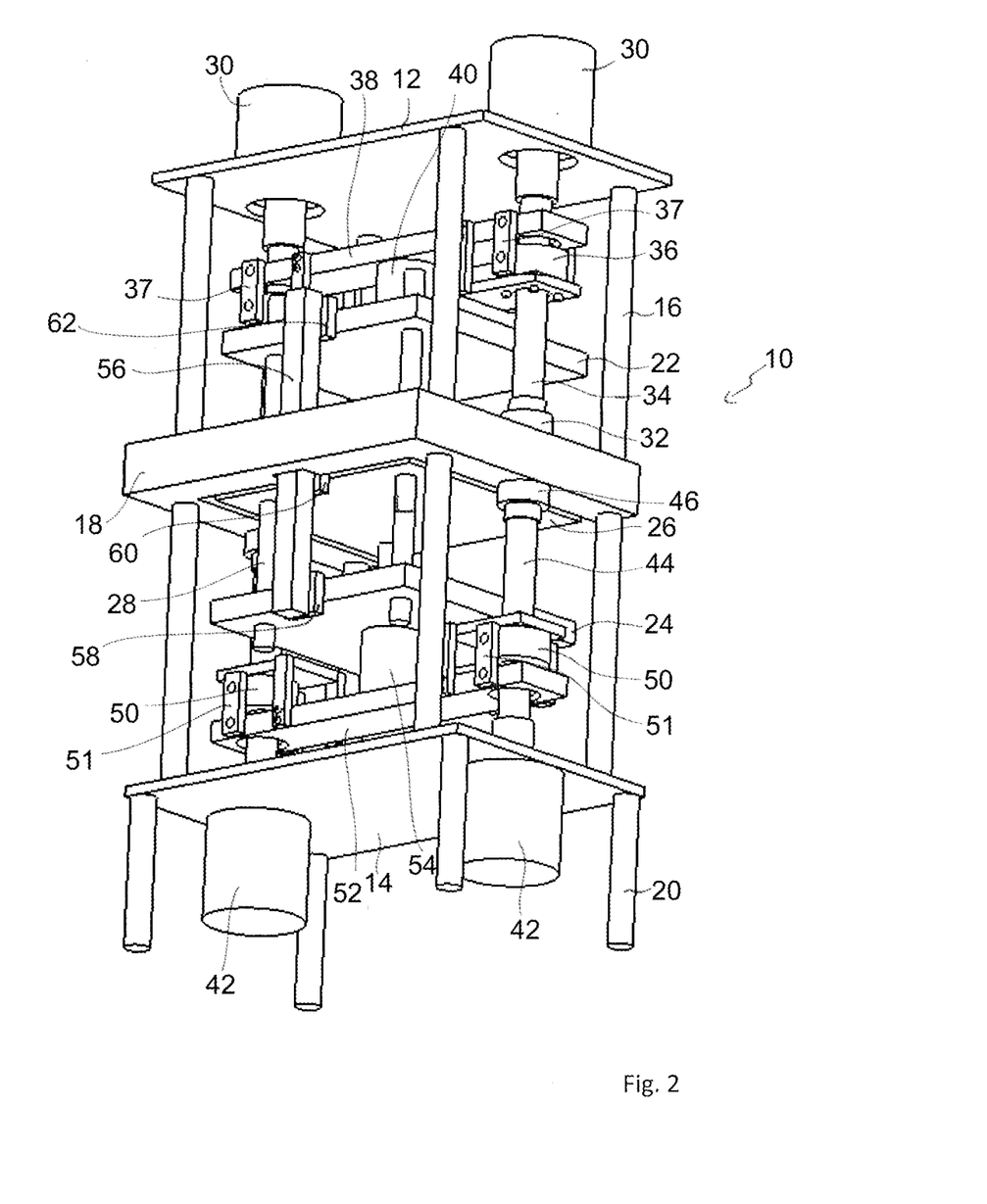
FIG. 2 is the press from FIG. 1 in a perspective view from behind.

The press according to FIG. 1 has a press frame 10 with an upper retaining plate 12 and a lower retaining plate 14. The upper and lower retaining plates 12, 14 are connected to each other by means of four spacers 16, running in a vertical direction in the portrayed example, and are connected to a support frame 18 arranged approximately in the middle between the upper and lower retaining plates 12, 14. In the example of FIG. 1, the support frame 18 is designed as a single part and has a U-shaped profile lying in a horizontal plane, an arrangement plane and an extension plane. In particular, the support frame 18 has two free limbs arranged in parallel to each other, and a section connecting the free limbs together on one end, the longitudinal axis of which runs rectangular to the longitudinal axes of the free limbs. The lower retaining plate 14 stands on the ground by means of four support legs 20.

The press further has a tool guiding unit formed as a module with an upper punch plate 22 having an upper punch a lower punch plate 24 having a lower punch and a die plate 26 arranged between the upper punch plate 22 and the lower punch plate 24. The die plate 26 has a receptacle (not shown) for powder, for example metal or ceramic powder, to be pressed using the upper and lower punches. The upper punch plate 22, the lower punch plate 24 and the die plate 26 are connected together by means of four vertical guide columns 28. The die plate 26, in this example, is fastened directly to the opposing insides of the free limbs of the support frame 18. The tool guiding unit can be removed as a whole from the press frame 10, and can be exchanged for another tool guiding unit.

The press further comprises two upper drive units for vertically moving the upper punch plate 22, and two lower drive units for vertically moving the lower punch plate 24. The upper and lower drive units are each arranged on two opposite sides of the press frame 10. The upper drive units each comprise an upper electric motor 30 arranged on the upper retaining plate 12 and an upper spindle drive. In the illustrated example, an upper fixed bearing 32 of each upper spindle drive is fastened directly to the top side of the support frame 18. An upper spindle nut 36 is arranged axially movable on each of the upper spindles 34. A rotation of the upper spindles 34 leads to an axial movement of respective upper spindle nuts 36. The upper spindle nuts 36 of the upper drive units are fastened to an upper force transmitting bridge 38, which is connected via an upper force transmitting element 40 to the upper punch plate 22. In this manner, axial movement of the upper spindle nuts 36 is transmitted to the upper punch plate 22 such that the upper punch plate 22 is also moved in an axial direction.

In this respect, the structure of the two lower drive units is identical. Thus, the lower drive units each have a lower electric motor 42 arranged on the lower retaining plate 14, each of which drives an axially fixed lower spindle 44. In each case, a lower fixed bearing 46 of each lower spindle drive is fastened directly to the lower side of the support frame 18. Fastening to the top side is also possible. A lower spindle nut 50 is in turn arranged on the lower spindles 44. The lower spindle nuts 50 are in turn connected to a lower force transmitting bridge 52, which is connected via a lower force transmitting element 54 to the lower punch plate 24. When the lower electric drive motors 42 rotatably drive the lower spindles 44, an axial movement of the lower spindle nuts 50 arises in turn. This axial movement is transmitted to the lower punch plate 24 by means of the lower force transmitting bridge 52 and the force transmitting element 54, such that the lower punch plate 24 is also moved in an axial direction.

Additionally, it is noted that the upper spindle nuts 36 and the lower spindle nuts 50 are each connected to the upper, or respectively lower, force transmitting bridges 38, 52 by means of rotatably mounted compensation elements 37, 51. The compensation elements 37, 51 ensure that a deformation of the force transmitting bridges 38, 52 that occurs during operation due to high press forces is not transmitted to the spindle drives.

As seen in the figures, the upper drive units are each supported, via the upper fixed bearings 32 thereof, directly at the support frame 18, and the lower drive units are each supported, via the lower fixed bearings 46 thereof, directly at the support frame 18. Thus, during a press procedure, force flows between the upper punch into the upper punch plate 22, from this via the upper force transmitting element 40 and the upper force transmitting bridge 38 into the two upper drive units, in particular, the upper spindles 34 and the upper fixed bearings 32 and from these into the support frame 18. Correspondingly, force flows from the lower punch into the lower punch plate 24 and via the lower force transmitting element 54 and the lower force transmitting bridge 52 into the lower drive units, in particular the lower spindles 44 and the lower fixed bearings 46, and from these in turn into the support frame 18. Thus only a few components are located in the force flow such that correspondingly few component tolerances add up. Because the arrangement plane of the support frame 18 lies in the same horizontal plane as the die plate 26 or in a plane only slightly offset from this, and the vertical spacers 16 do not participate substantially in the force flow, there is only a minimal deflection and thus there is minimal bending of the press frame 10. However, insofar as there are deformations of the press frame 10, these do not in any case lead to a deformation of the support frame 18, which is decoupled in this respect from deformations of the press frame 10. Due to the exclusive fastening of the tool guiding unit to the support frame 18 by means of the die plate 26, the tool guiding unit is also decoupled from possible deformation of the press frame 10.

As shown, a measurement ruler 56 with a vertical measurement axis is fastened to the section connecting the free limbs of the support frame 18, and specifically in its longitudinal center, that is, in the thermal zero point thereof. The measurement ruler 56 is exclusively fastened to the support frame 18, such that this is also decoupled from any possible deformation of the press frame 10 in the course of a pressing procedure. A measurement slide 58, 60, 62 is attached respectively to the upper punch plate 22, the lower punch plate 24 and the die plate 26. Each measurement slide 58, 60, 62 interacts with the measurement ruler 56 such that both a vertical movement, thus the vertical position, as well as any possible deformation, for example a bending of the upper punch plate 22, the lower punch plate 24 and the die plate 26, can be measured. For this purpose almost any known measurement apparatuses can be used, for example, optical sensors, proximity sensors or the like.

Figure 3:
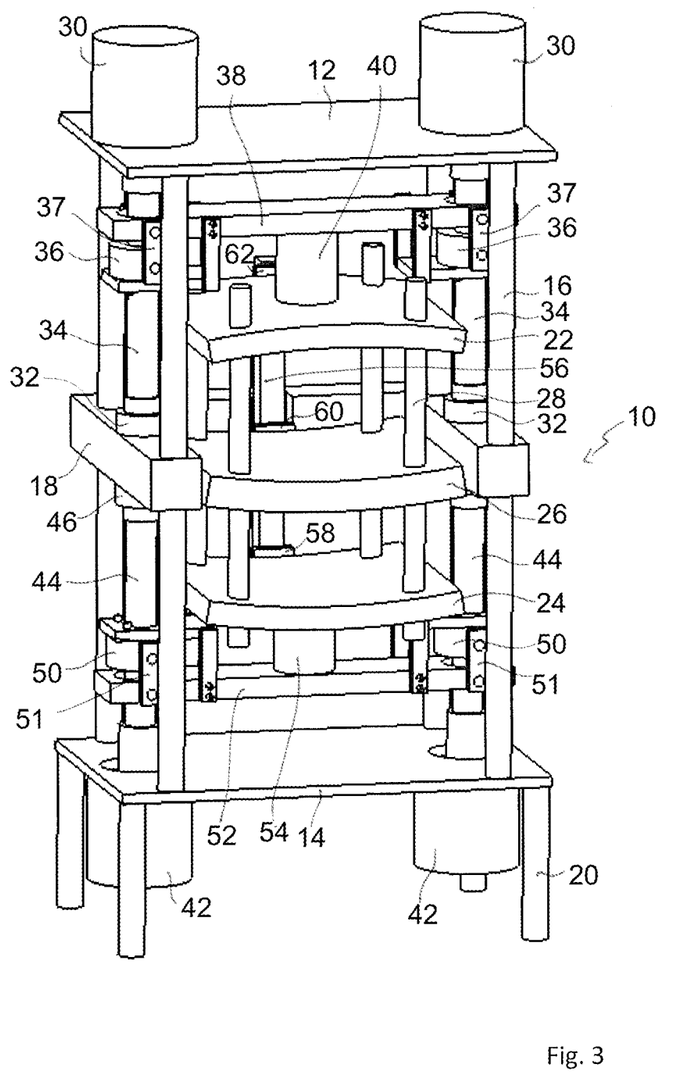
FIG. 3 the view from FIG. 1 in an operating state of the press.
Figure 4:
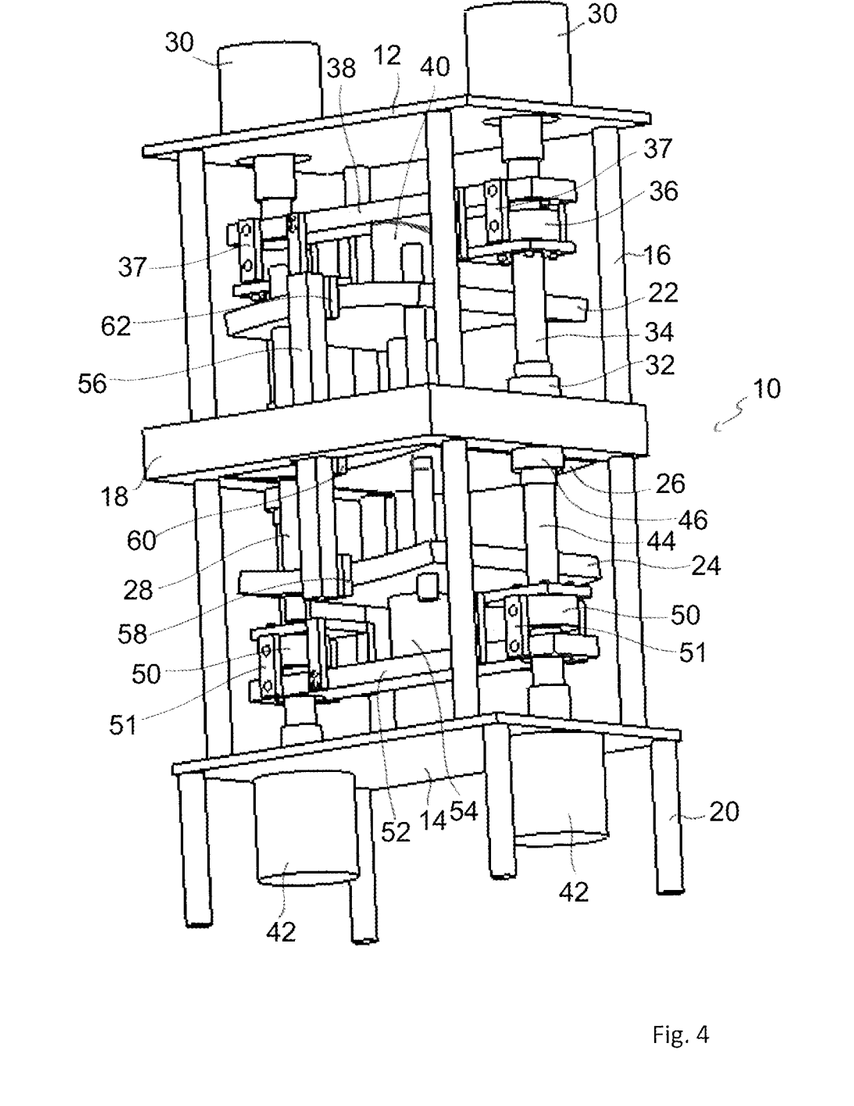
FIG. 4 the view from FIG. 2 in an operating state of the press.

A bending of the upper and lower punch plates 22, 24 and the die plate 26 occurring in the course of the pressing procedure due to the strong press forces is shown considerably exaggerated in FIGS. 3 and 4 for visualization purposes. The measurement is performed at the location of the greatest bending due to the central arrangement of the measurement ruler 56. Furthermore, because the measurement ruler 56 is fastened at the thermal zero point thereof to the support frame 18, and in turn the support frame 18 and also the die plate 26 are arranged at the thermal zero point of the press, thermal influences do not have any effect on the measurement performed.

The invention has been described using certain implementations, but it is not limited thereto. References to "a" or "an" element in the description and claims refer to one or more of those elements unless expressly limited.

What is claimed is:

1. A press for producing pellets from powdered material, comprising:
   a press frame with an upper retaining plate, a lower retaining plate and a support frame, the upper retaining plate and the lower retaining plate connected together by a plurality of vertical spacers and the support frame arranged between the upper retaining plate and the lower retaining plate;
   a tool guiding unit including:
      at least one of an upper punch plate having an upper press punch or a lower punch plate having a lower press punch; and
      a die plate having a receptacle for powdered material to be pressed by at least one of the upper press punch or the lower press punch;
   at least one of an upper drive unit for moving the upper punch plate in a vertical direction or a lower drive unit for moving the lower punch plate in the vertical direction; wherein
      the at least one of the upper drive unit or the lower drive unit is supported at the support frame during operation in such a manner that reaction forces, which are generated in response to press forces produced during pressing of the powdered material in the receptacle, are introduced into the support frame;
      the support frame surrounds the die plate of the tool guiding unit and is formed in sections; and
      the die plate is fastened at opposite sides of the support frame;
   a measurement ruler fastened to the support frame in a plane between the opposite sides of the support frame; and
   a respective measurement slide arranged at the die plate and the at least one of the upper punch plate or the lower punch plate, wherein the measurement slide interacts with the measurement ruler in such a manner that vertical movement and bending of at least one of the upper punch plate, the lower punch plate or the die plate during the pressing of the powdered material are measured.

2. The press of claim 1, wherein the measurement ruler is fastened to the support frame in a plane lying centrally between the opposite sides of the support frame.

3. The press of claim 1, wherein the support frame has a U-shape that lies in a horizontal plane, the die plate is fastened to opposing free limbs of the support frame, and the measurement ruler is fastened to a section of the support frame connecting the opposing free limbs.

4. The press of claim 1, wherein the die plate and the support frame are arranged in a same plane or in planes slightly offset from each other.

5. The press of claim 1, wherein the tool guiding unit forms a module that is removable from the press as a whole for exchange with another tool guiding unit also forming a module.

6. The press of claim 1, wherein at least one of: when the at least one of the upper drive unit or the lower drive unit comprises the upper drive unit,
- the upper drive unit is arranged between the support frame and the upper punch plate, the upper drive unit fastened directly or via an upper force transmitting element to the upper punch plate; or when the at least one of the upper drive or the lower drive unit comprises the lower drive unit,
- the lower drive unit is arranged between the support frame and the lower punch plate or the die plate, the lower drive unit fastened directly, or via a lower force transmitting element, to the lower punch plate or the die plate.

7. The press of claim 6, wherein at least one of:
- when the at least one of the upper drive unit or the lower drive unit comprises the upper drive unit,
- the upper force transmitting element comprises an upper force transmitting bridge and two upper drive units are fastened to the upper force transmitting bridge; or
- when the at least one of the upper drive unit or the lower drive unit comprises the upper drive unit,
- the lower force transmitting element comprises a lower force transmitting bridge and two lower drive units are fastened to the lower force transmitting bridge.

8. The press of claim 1, wherein at least one of: when the at least one of the upper drive unit or the lower drive unit comprises the upper drive unit,
- the upper drive unit comprises an upper spindle drive driven by an electric motor; or when the at least one of the upper drive unit or the lower drive unit comprises the lower drive unit,
- the lower drive unit comprises a lower spindle drive driven by an electric motor.

9. The press of claim 8, wherein at least one of: when the at least one of the upper drive unit or the lower drive unit comprises the upper drive unit,
- the electric motor of the upper spindle drive is fastened to the upper retaining plate of the press frame; or when the at least one of the upper drive unit or the lower drive unit comprises the lower drive unit,
- the electric motor of the lower spindle drive is fastened to the lower retaining plate of the press frame.

10. The press of claim 8, further comprising at least one of:
- an upper fixed bearing of an upper spindle of the upper spindle drive fastened to the support frame, and an upper spindle nut of the upper spindle drive fastened directly, or via an upper force transmitting element, to the upper punch plate; or
- a lower fixed bearing of a lower spindle of the lower spindle drive fastened to the support frame, and a lower spindle nut of the lower spindle drive fastened directly, or via a lower force transmitting element, to at least one of the lower punch plate or the die plate.

\* \* \* \* \*